May 27, 1958    O. W. BANIK ET AL    2,836,355

REMOTE FUNCTION CONTROL SYSTEM

Filed March 4, 1955            3 Sheets-Sheet 1

*INVENTOR.*
DURAY E. STROMBACK
OSCAR W. BANIK
BY

*Leo Wilder*

ATTORNEY

May 27, 1958

O. W. BANIK ET AL 2,836,355

REMOTE FUNCTION CONTROL SYSTEM

Filed March 4, 1955

INVENTOR.
DURAY E. STROMBACK
OSCAR W. BANIK

BY

*Leo Wilder*

ATTORNEY

May 27, 1958

O. W. BANIK ET AL 2,836,355

REMOTE FUNCTION CONTROL SYSTEM

Filed March 4, 1955

INVENTOR.
DURAY E. STROMBACK
OSCAR W. BANIK

BY

ATTORNEY

United States Patent Office 2,836,355
Patented May 27, 1958

2,836,355

REMOTE FUNCTION CONTROL SYSTEM

Oscar W. Banik and Du Ray E. Stromback, Paoli, Pa., assignors to Burroughs Corporation, Detroit, Mich., a corporation of Michigan Application March 4, 1955, Serial No. 492,266

11 Claims. (Cl. 235—60.47)

This invention relates to automatic business machines of the type adapted to do accounting work, and more particularly to a system for remotely controlling the functions and operation of said machines.

There are presently available accounting machines which through internal programming are adapted to automatically perform a multiplicity of different operations in accordance with a preselected format. One machine of this type is set forth in Patent No. 2,629,549, issued to T. M. Butler, February 24, 1953, for an Automatic Function Control Mechanism for Accounting Machines. Machines of this type incorporate a program tray detachably connected to the carriage and jointly movable therewith. A series of depending control pins of various lengths extend downwardly from the tray. Contained within the machine immediately below the tray and extending transversely thereto are a plurality of sensing tappets. As the machine performs its functions, the carriage and tray, and therefore also the pins, move transversely across the machine. Accordingly, during each cycle of operation of the machine one or more of the pins is placed in alignment with the above mentioned sensing tappets. The tappets in turn are respectively pin connected to one of the ends of a plurality of control arms having floating fulcrums. The opposite ends of the respective control arms engage various levers of the machine. The amount of movement imparted to these levers determines and controls the various functions of the machine.

During each cycle of operation of the machine the control arms and the tappets which are connected thereto are raised by associated cams. However, the depending pins which are selectively placed in alignment with the tappets determine, in a manner to be hereinafter described, the height to which the opposite ends of the arms will be raised by the cams. The height to which the arms are raised determines the amount of movement of the above mentioned levers which in turn control the functions of the machine.

It may therefore be seen that by placing pins of selected heights at predetermined positions within the program tray, a desired format and sequence of operations may be obtained automatically since the function to be performed is determined by the amount of movement imparted to the levers and this movement is fixed by the length of the pins aligned with the sensing tappets at any given time. A more detailed description of this mode of function control is set forth in the above identified patent to Butler.

Due to the increased complexity and diversity of business operations it has been found that a machine of the above described type is inadequate for certain applications. A greater degree of flexibility is now required than can be obtained solely through the utilization of a program tray. In addition, it is sometimes desirable to perform various operations from a point remote to the location of the machine.

It is accordingly an important object of the instant invention to provide a system whereby the flexibility of machines of the above described character may be greatly enhanced.

An additional object of this invention is to provide a system whereby the programming and format of the machine may be controlled from a remote source. For a greater appreciation of these and other objects of this invention reference is made to the following description and the accompanying drawings wherein.

Figure 1:
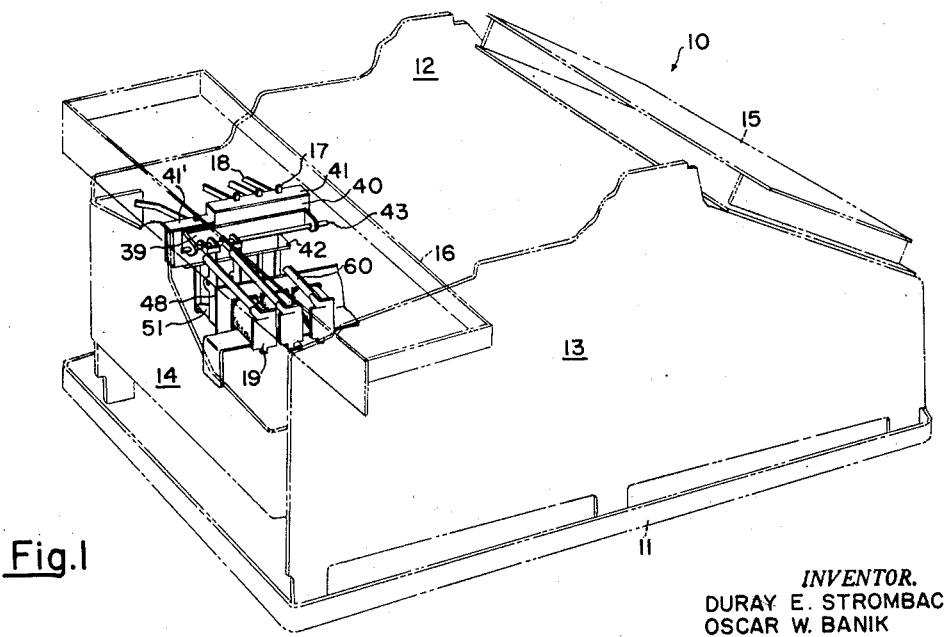
Fig. 1 is a diagrammatic view of a portion of a business machine constructed in accordance with the instant invention.

Referring now more particularly to the drawings it may be seen in Fig. 1 that the numeral 10 broadly designates a business machine having a base 11, side plates 12 and 13, a rear plate 14, and a keyboard represented diagrammatically at 15. The control tray shown in phantom at 16 is attached to the carriage (not shown) of the machine in a manner fully disclosed in the aforesaid Butler patent, so as to move therewith transversely across the machine while the latter is in operation. Below the control tray and extending transversely thereto are a plurality of tappets 17 which are constrained against horizontal movement but which may move freely in a vertical direction. Attached to the tappets in a manner which will be more fully described hereinafter are the control arms 18. Immediately to the left of the tappets, when the machine 10 is viewed from in front of the keyboard, are the solenoid controls 19 which may be connected to the tappets in a manner which will be stated hereinafter.

Figures 2, 3, 4:
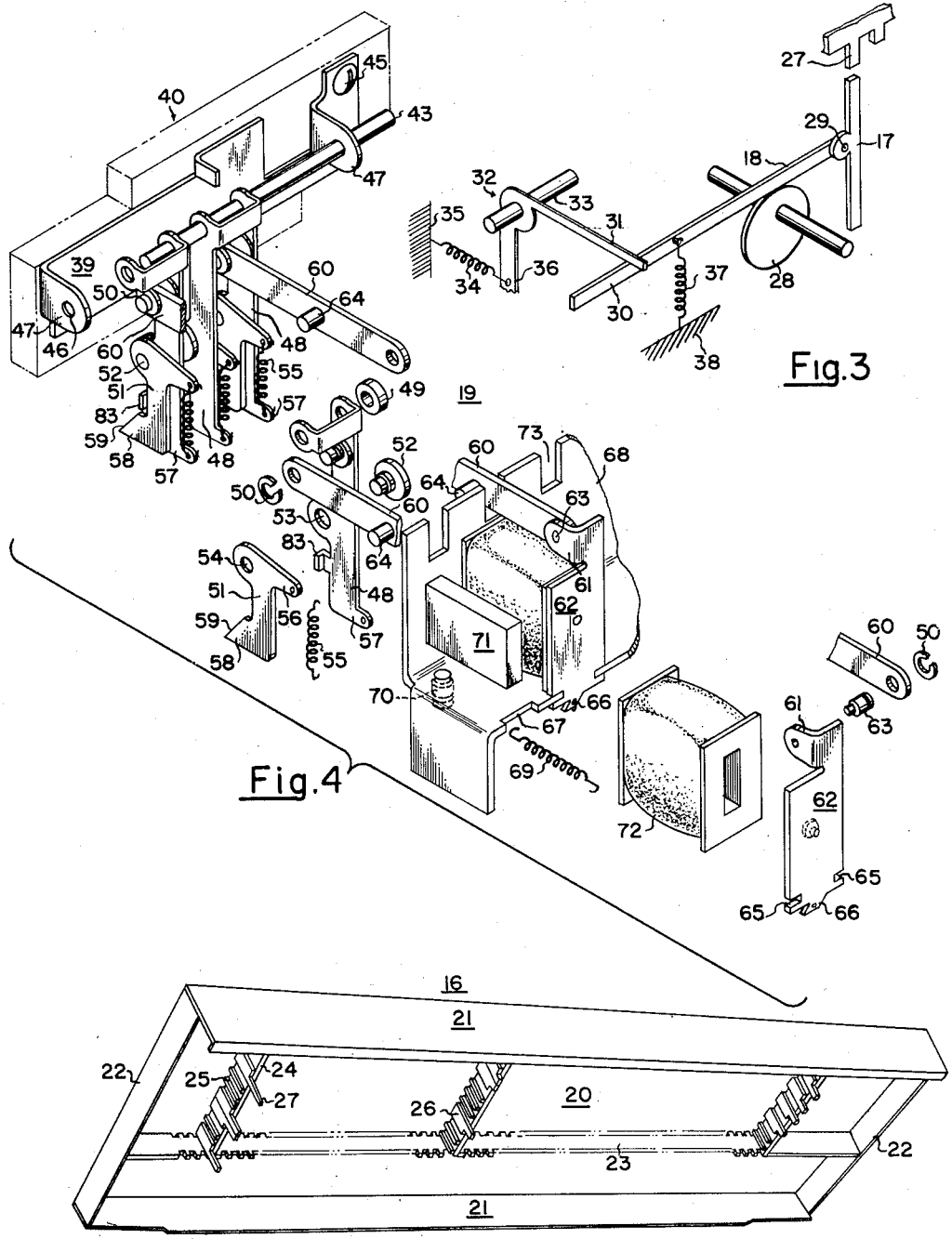
Fig. 2 is a diagrammatic view of the program tray of the machine of Fig. 1.
Fig. 3 is a sketch illustrating the kinematic relationship of the elements which control the functioning of the machine.
Fig. 4 is an exploded view of the solenoid control means.

Referring now more particularly to Fig. 2, it may be seen that the control tray comprises a sheet metal section whose ends have been turned inwardly so as to form a box-like container having a top 20, sides 21 and ends 22. Stretched longitudinally across the tray are a pair of elongated members 23, only one of which is visible in Fig. 2, having opposed notches therein. Mounted between the notches and extending transversely across the tray are a plurality of parallel plates 24 having vertical ribs 25 therein. Fixed to the plates and contained between the ribs are a plurality of lugs 26, each of which has integral therewith and depending therefrom a pin 27. The pins, as is indicated in the drawing, vary in height. As the carriage is tabulated across the machine during the performance of an accounting operation, various groups of the above mentioned lugs 26 will be aligned with the tappets 17 so that the pins on these lugs will be sequentially positioned immediately above their associated tappets.

Reference is now made more particularly to Fig. 3 which is a kinematic representation of the manner in which the pins 27 control the operation of the machine. Herein, and for the purpose of clarity, only one control arm and its related elements will be discussed. However it should be noted that the following description applies equally well to the other control arms. It may be seen from the drawing that a cam 28 is located immediately below the control arm 18. One end 29 of the arm is pin connected to tappet 17 while the opposite end 30 is positioned below lever 31 of bell crank 32 which is mounted for rotation in a vertical plane about shaft 33. A spring 34 is attached at its opposite ends to a fixed abutment 35 and to the vertical lever 36 of the bell crank. A similar spring 37 is attached at one end to an abutment 38. At its opposite end, spring 37 is attached to the control arm 18 at a point on the arm between the cam 28 and the lever 31. When the parts are in their idle position as is illustrated in Fig. 3, the springs 34 and 37 are unstressed. As the cam 28 rotates, its high side will tend to raise the arm 18. However, because of the presence of the springs 34 and 37 the arm will tend to rotate about a fulcrum defined by the point of contact between end 30 of control arm 18 and lever 29. As a result the pin connected end 29 of the arm 18 will be raised carrying the tappet 17 therewith while the opposite end 30 will remain substantially stationary. It may be recalled that the tappet 17 is constrained against horizontal movement but is permitted to move in a vertical direction. When the upper edge of the tappet 17 strikes the depending control pin 27 its upward motion is stopped and the fulcrum of rotation of the control arm 18 shifts from end 30 to end 29 of the control arm with the result that the end 30 will commence to rise against the resistance of its spring 37 and will cause the bell crank 32 to rotate in a counter clockwise manner against the resistance of its spring 34. The degree of rotation of said bell crank will determine the function which the machine will perform as is fully described in the above identified patent to Butler.

From the above, it can be seen that the degree of rotation of bell crank 32 is determined by the height to which tappet 17 is permitted to rise prior to its striking pin 27. Accordingly, the longer the pin, the less the tappet will rise, and the greater will be the degree of rotation of bell crank 32. If the pins 27 on each plate 24 in the tray 16 are of selectively determined lengths it is possible to change the degree of rotation of bell crank 30 in accordance with a predetermined program at each position of the carriage, and therefore determine the sequence of operations to be performed by the machine at or after the above mentioned carriage position. However the above described procedure for automatically determining the programming and functioning of the machine has its limitations. Only one pin may be at any given location at any one time, and therefore the degree of flexibility of the machine is delineated. If it were possible to apparently change the vertical dimension of any or all of the fixed pins 25 without actually doing so, it should be obvious that the flexibility and versatility of the machine would be greatly enhanced.

Referring now more particularly to Fig. 4 it may be seen that a frame 39 is fixedly attached by means of screws 45 to a plate 40 which as is illustrated in Fig. 1 is connected to the rear plate 14 of the machine and extends forwardly therefrom. As is indicated in Figs. 1, 5, 6 and 7 the plate 40 carries on its upper surface the guide strips 41 and 41', and on its lower surface the guide strip 42 for the tappets 17. A shaft 43 having a series of spaced constrictions 44 (see Fig. 6) therein is mounted in perforations 46 contained within inturned ears 47 of the frame 39. Four downwardly extending levers 48 are mounted on the shaft by means of yokes integral with the upper ends of said levers so that they may rotate about shaft 43 in parallel vertical planes. Referring now more particularly to Fig. 6, it may be seen that the yoke of the leftmost lever 48 abuts the interior surface of the left ear 47 of the frame and that a spacer bushing 49 concentric with the shaft 43 is interposed between the above mentioned lever and the one adjacent to it. A C-ring 50 is forced into a constriction 44 on the shaft immediately to the right of the last mentioned lever so as to prevent lateral movement of these two levers with respect to shaft 43. As is illustrated in both Figs. 4 and 6, the two rightmost levers 48 are integral with the identical yoke and are prevented from moving laterally with respect to shaft 43 by a pair of C-rings 50 forced on to constrictions 44 of the shaft immediately inboard of both sides of the yoke. An additional C-ring 50 is forced onto shaft 43 immediately inboard of the rightmost ear 47 of the frame 39 in order to prevent axial movement of the shaft with respect to the frame. Boots 51 having toes 58 with cam surfaces 59 thereon are rotatably mounted on levers 48 by means of headed pins 52 which pass through mating perforations 53 and 54 in the levers and boots respectively. A spring 55 is connected between parallel arms 56 and 57 on the boots and levers respectively so as to urge the boots in a clockwise direction into engagement with ears 83 extending out from the leftmost edges of the levers.

An elongated transmission arm 60 is pin connected to each lever at a point immediately below the yoke and retained thereon by C-ring 50. It should be noted that since the two rightmost levers 48 are connected to the same yoke, only one transmission arm is needed for both levers. Accordingly, only three transmission arms are provided. The opposite end of each transmission arm 60 is connected to an inturned ear 61 on an associated clapper 62 by means of pin 63 and C-ring 50. Substantially midway between its ends each transmission arm 60 has a laterally extending stop pin 64, the purpose of which will be explained hereinafter. The clappers 62 have in their lower ends a pair of opposed notches 65 and a depending perforated lug 66. The notches 64 mate with a depression 67 on the lower rearward end of the solenoid frame 68 so as to provide a fulcrum for the clappers 62. A spring 69 extends from the perforated lug 66 on each clapper to an associated pin 70 depending from the lower surface of the frame 68 so as to urge the clappers to rotate in a clockwise direction about their respective fulcrums 67. A plurality of elongated core members 71 extending outwardly from the frame 68 carry thereon coils 72. The transmission arms 60 connect the levers 48 and the clappers 62, and pass through guide notches 73 provided in the frame 68 for the purpose of maintaining the proper alignment of said transmission arms.

Figure 5:
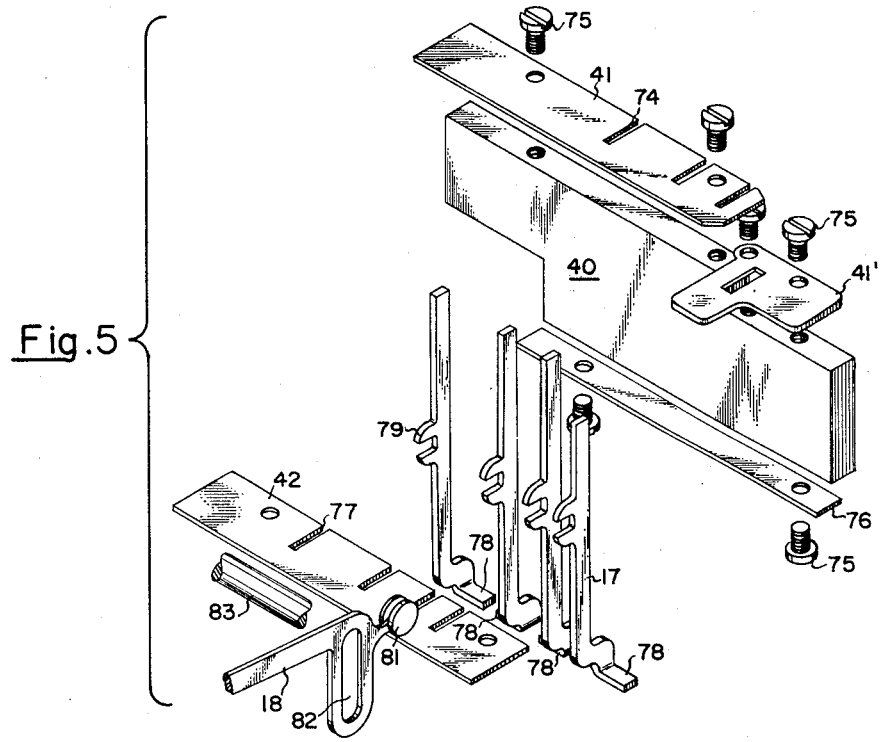
Fig. 5 is an exploded view of the sensing tappets and control levers in conjunction with which the solenoids of Fig. 4 operate.
Figure 6:
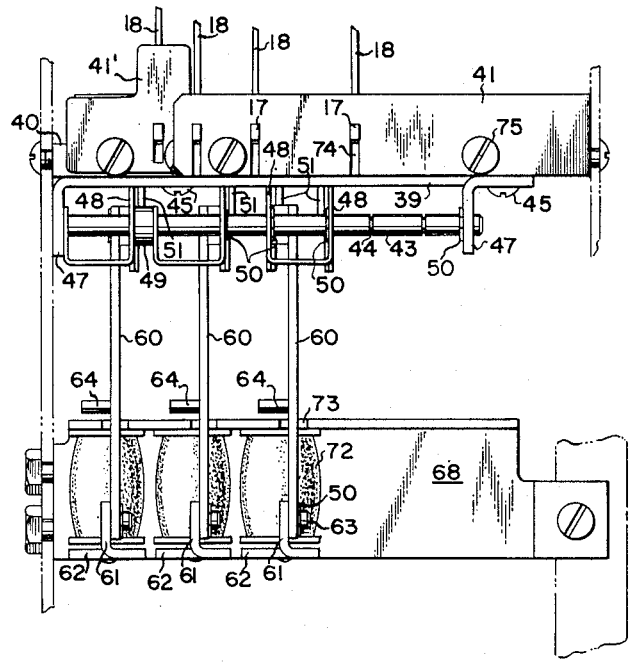
Fig. 6 is a top plan view illustrating the manner in which the solenoids are connected to the tappets.

Referring now more particularly to Fig. 5, it may be seen that the plate 40 has a stepped upper surface (best illustrated in Fig. 4). The guide strip 41 having a plurality of transverse slots 74 therein is attached to the higher of the two upper surfaces of the plate 40 by means of screws 75, while the guide strip 41' is similarly attached to the lower of the two surfaces. The slots 74 are provided for the guidance of the tappets 17 in their vertical paths of movement. A similar guide plate 42 having slots 77 therein is mounted on the lower surface of the plate 40 by means of screws 75 with strip 76 interposed between the screws and guide plate 42. The respective slots 74 and 77 are arranged in registration with one another so as to maintain the tappet 17 substantially parallel and in freely movable vertical alignment. As may be seen from the drawing each of the tappets has at its lower end a horizontally extending lug 78. The lugs on the outermost tappets 17 extend toward the right while the lugs on the inner tappets extend toward the left for a purpose to be hereinafter explained. Substantially midway between its ends, each of the tappets has integral therewith a pair of outwardly extending jaws 79 in which the rounded ends 80 (see Fig. 7) of the control arms 18 are pivoted. Parallel to and carried on each side of the above mentioned rounded ends 80 are buttons 81 which overlie the jaws so as to prevent the transverse displacement of the control arm with respect thereto. Immediately inboard of its rounded end each control arm has a vertically elongated slot 82 through which passes a stationary guide rod 83. The opposite ends of the guide rod may be anchored to any convenient abutments located within the machine 10.

Figure 7:
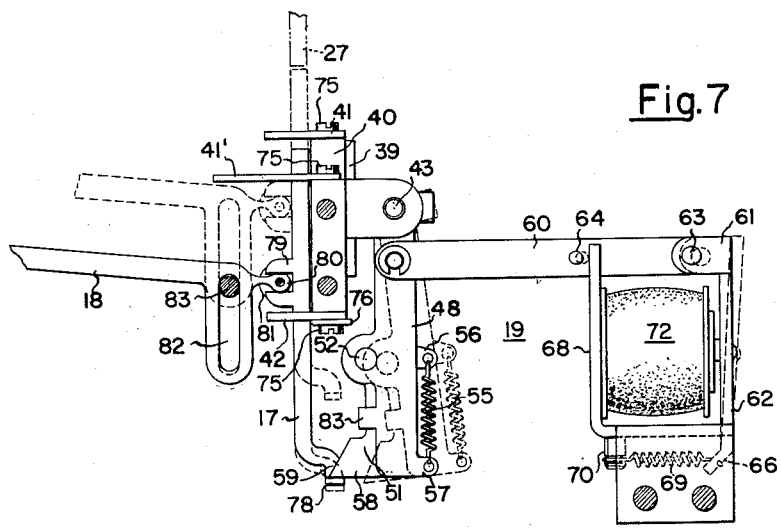
Fig. 7 is a side elevational view of the assemblage of Fig. 6.

Referring now more particularly to Fig. 7 and assuming that a cycle of operation of the machine is about to commence the low side of cam 28 (see Fig. 3) is contiguous to its associated control arm 18 and the tappet is accordingly in its lowermost position as is illustrated in full lines. As the cam rotates its high side forces arm 18 and therefore the associated tappet 17 upward toward the phantom position indicated in Fig. 7, at which time the upper surface of the tappet strikes the aligned pin 27 so as to compel the bell crank 32 to rotate and institute a predetermined operation as was previously described.

Assume that in a subsequent cycle when the carriage is located at a position identical to that which was described above it is desired to perform a function which would normally be caused only by a pin longer than that existent in this particular location. Through the employment of the facilities heretofore available the automatic performance of such function would be impossible. However, if the machine is provided with the instant invention such change of programming can be accomplished with facility. It is merely necessary to energize the associated solenoid 72 and so cause the clapper 62 to rotate against the resistance of its spring 69 from the phantom position of Fig. 7 toward the solenoid as is indicated in full lines. Such motion of the clapper is conveyed to the lever 48 by the transmission arm 60, causing said lever to move from the phantom position to the full line position where the toe 58 of its boot 51 is placed immediately above the lug 78 of the corresponding tappet 17. Accordingly, when the cam 28 commences to rotate so as to tend to raise the arm 18 the lug 78 of the associated tappet 17 will engage toe 58 and tend to rotate said toe in a clockwise direction about its pivot 52. However, the ear 83 of the lever 48 is in the path of clockwise rotation of the boot preventing the latter from moving and so holding the tappet 17 stationary. This has the same effect upon the tappet as would the presence of a long pin 27, and as previously explained compels the bell crank 32, see Fig 3, to rotate to a proportionately greater extent and so cause the institution of the desired function; a function other than that which would result from the presence of a short pin acting alone.

When the solenoid 72 is de-energized, the spring 69 compels the clapper 62 to rotate in a clockwise manner about its fulcrum from the full line to the phantom position of Fig. 7, thus drawing the transmission arm toward the right until the stop pin 64 limits the motion of the arm by contacting the upstanding portion of the frame 68. The rightward movement of the arm 60 imparts a counterclockwise rotation to the lever 48, drawing the latter from its full line position to that indicated in phantom. The presence of ear 83 on the lever provides for the positive movement of the boot with the lever so as to insure the removal of the boot from the path of the tappet 17. The tappet may then unimpededly move upwardly during a subsequent cycle, to the position indicated in phantom to engage a short pin. If for some reason the boot 58 is in the path of the tappet while the latter is moving downwardly from its phantom to the full line position, the lug 78 of the tappet will strike the inclined surface 59 of the boot camming the latter out of the path of the tappet. When the tappet reaches the end of its downward travel the spring 55 urges the boot back toward its normal position.

It may therefore be seen that by utilizing the instant invention in existent automatic accounting machines the versatility of programming of such machines is greatly enhanced. It is now possible to automatically and selectively create an effect identical to that which could previously only be accomplished by stopping the machine and manually replacing a short pin with a long one and then subsequently removing the long pin and returning the short one to its original position. The resultant increase in efficiency of operation should be obvious.

Although the instant invention was disclosed herein as being applied to four of the sensing tappets located at specifically defined positions within the machine, it is obvious that without in any way departing from the scope or spirit of this invention the same application may be made to a greater or lesser number of the sensing tappets present in the machine as is dictated by the specific purpose for which the machine is intended.

Having thus disclosed an exemplary embodiment thereof, what we claim as our invention is:

1. A function control system of the class described comprising, movable means for controlling the operation of an associated machine, movement of said control means by preselected amounts from a given position resulting in corresponding predetermined changes in the sequence of operations performed by said associated machine, movable sensing means operatively connected to the control means so that any movement of said sensing means of less than a predetermined distance will result in a movement by said control means from the above mentioned given position, the magnitude of the movement of the control means being dependent upon and determined by the magnitude of the movement of the sensing means, a plurality of abutments of selected lengths movable into alignment with the sensing means in accordance with a predetermined schedule, means for yieldingly moving the sensing means into contact with the then aligned abutment, the length of the aligned abutment limiting the distance which the sensing means may move, and additional means for selectively arresting the movement of the sensing means prior to the engagement of said sensing means with the then aligned abutment.

2. A function control system as in claim 1 wherein the additional means comprises a rotatable member having a boot rotatably mounted thereon, an ear integral with the rotatable member and extending into the path of rotation of the boot, and means yieldingly urging the boot into contact with the ear.

3. A function control system as in claim 2 wherein the additional means further includes a solenoid having a pivotally mounted clapper associated therewith, a spring urging said clapper to rotate away from the solenoid, energization of the solenoid causing the clapper to move toward said solenoid against the resistance of the spring associated with said clapper, and a member operatively connecting the clapper and rotatable member so that any movement of the clapper will result in a correspondingly proportional movement of the rotatable member and its associated boot.

4. A function control system as in claim 3 wherein the sensing means has a lug integral therewith, said lug passing through the plane in which the above mentioned boot rotates, energization of the solenoid resulting in the movement of the boot into the path of movement of the lug so that said lug will strike the boot when the sensing means moves a predetermined distance.

5. A function control system as in claim 4 wherein the boot has an inclined cam surface thereon, engagement of the lug with the cam surface on the boot when the sensing means is moving in one direction resulting in the rotation of the boot away from the ear on its associated rotatable member and out of the path of movement of the lug, engagement of the lug with the boot when the sensing means is moving in a direction opposite to the above mentioned direction resulting in the positive arrestment of the lug and therefore the sensing means by the boot.

6. A function control system as in claim 1 including motivating means comprising, a member operatively associated with both the sensing means and the control means, means for yieldingly retaining the control means and that portion of the above mentioned member associated with said control means in a substantially fixed position, and cam means for raising and lowering the associated member, raising of the associated member resulting initially in the movement of the sensing means until the motion of said means is positively arrested, followed after such motion has been positively arrested by the movement of the control means against the resistance of the last mentioned yielding means.

7. A function control system as in claim 6 wherein the additional means comprises a rotatable member having a boot rotatably mounted thereon, an ear integral with the rotatable member and extending into the path of rotation of the boot, and means yieldingly urging the boot into contact with the ear.

8. A function control system as in claim 7 wherein the additional means further includes a solenoid having a pivotally mounted clapper associated therewith, a spring urging said clapper to rotate away from the solenoid, energization of the solenoid causing the clapper to move toward said solenoid against the resistance of the spring associated with said clapper, and a member operatively connecting the clapper and rotatable member so that any movement of the clapper will result in a correspondingly proportional movement of the rotatable member and its associated boot.

9. A function control system as in claim 8 wherein stop means are provided for the purpose of positively limiting the rotation of the clapper away from its associated solenoid.

10. A function control system as in claim 8 wherein the sensing means has a lug integral therewith, said lug passing through the plane in which the above mentioned boot rotates, energization of the solenoid resulting in the movement of the boot into the path of movement of the lug so that said lug will strike the boot when the sensing means moves a predetermined distance.

11. A function control system as in claim 10 wherein the boot has an inclined cam surface thereon, engagement of the lug with the cam surface on the boot when the sensing means is moving in one direction resulting in the rotation of the boot away from the ear on its associated rotatable member and out of the path of movement of the lug, engagement of the lug with the boot when the sensing means is moving in a direction opposite to the above mentioned direction resulting in the positive arrestment of the lug and therefore the sensing means by the boot.

References Cited in the file of this patent
UNITED STATES PATENTS

| | | |
|---|---|---|
| 1,965,884 | Crosman | July 10, 1934 |
| 2,615,622 | Anderson | Oct. 28, 1952 |
| 2,616,623 | Goodbar et al. | Nov. 4, 1952 |
| 2,629,549 | Butler | Feb. 24, 1953 |